United States Patent
Schoor

(10) Patent No.: US 10,914,818 B2
(45) Date of Patent: Feb. 9, 2021

(54) ANGLE-RESOLVING FMCW RADAR SENSOR

(71) Applicant: Robert Bosch GmbH, Stuttgart (DE)

(72) Inventor: Michael Schoor, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 658 days.

(21) Appl. No.: 14/900,688

(22) PCT Filed: May 14, 2014

(86) PCT No.: PCT/EP2014/059851
§ 371 (c)(1),
(2) Date: Dec. 22, 2015

(87) PCT Pub. No.: WO2014/206630
PCT Pub. Date: Dec. 31, 2014

(65) Prior Publication Data
US 2016/0131742 A1 May 12, 2016

(30) Foreign Application Priority Data

Jun. 25, 2013 (DE) .......... 10 2013 212 090

(51) Int. Cl.
G01S 13/42 (2006.01)
G01S 13/93 (2020.01)
(Continued)

(52) U.S. Cl.
CPC ............ *G01S 7/352* (2013.01); *G01S 13/426* (2013.01); *G01S 13/931* (2013.01); (Continued)

(58) Field of Classification Search
CPC ...................................... G01S 7/352
(Continued)

(56) References Cited

U.S. PATENT DOCUMENTS 6,804,312 B1 * 10/2004 Win ............... H04B 7/0632
375/347
9,620,856 B2 * 4/2017 Jin ............... H01Q 3/30
(Continued)

FOREIGN PATENT DOCUMENTS

CN 1712986 A 12/2005
CN 102356332 A 2/2012
(Continued)

*Primary Examiner* — Erin F Heard
*Assistant Examiner* — Helena H Seraydaryan
(74) *Attorney, Agent, or Firm* — Norton Rose Fulbright US LLP; Gerard Messina

(57) ABSTRACT

An angle-resolving FMCW radar sensor, including multiple antenna elements in positions in a direction in which the radar sensor is angle-resolving and forming at least three transmitter arrays and at least one receiver array, and a control/evaluation device for an operating mode in which transmitter arrays periodically transmit signals whose frequency is modulated according to modulation ramps, and in which radar echoes of transmitted signals are received in by multiple antenna elements of the receiver array, and the located object angle is determined based on amplitude and/or phase relationships between radar echoes which correspond to different combinations of transmitter and receiver arrays. A measuring cycle of the radar sensor includes at least two periods in which in each case at least two combinations of transmitter and receiver arrays are alternated, and the combinations of transmitter and receiver arrays involved are different from one another for the at least two periods.

14 Claims, 7 Drawing Sheets

(51) Int. Cl.
*G01S 7/35* (2006.01)
*H01Q 1/32* (2006.01)
*G01S 13/931* (2020.01)
*H01Q 3/24* (2006.01)
*H01Q 21/22* (2006.01)
*H01Q 3/26* (2006.01)
*H01Q 25/00* (2006.01)

(52) U.S. Cl.
CPC ........... *H01Q 1/3233* (2013.01); *H01Q 3/247* (2013.01); *H01Q 3/2605* (2013.01); *H01Q 21/22* (2013.01); *H01Q 25/00* (2013.01)

(58) Field of Classification Search
USPC ........................................................ 342/128
See application file for complete search history.

(56) References Cited

U.S. PATENT DOCUMENTS

| | | | | |
|---|---|---|---|---|
| 2003/0164791 | A1* | 9/2003 | Shinoda | G01S 13/4463 342/70 |
| 2005/0225481 | A1* | 10/2005 | Bonthron | G01S 7/032 342/175 |
| 2010/0277361 | A1* | 11/2010 | Focke | G01S 13/345 342/133 |
| 2011/0309968 | A1 | 12/2011 | Reiher et al. | |
| 2014/0022111 | A1* | 1/2014 | Kuehnle | G01S 13/584 342/109 |

FOREIGN PATENT DOCUMENTS

| | | | |
|---|---|---|---|
| EP | 1 486 796 | 12/2004 | |
| EP | 206 09 29 | 5/2009 | |
| EP | 2060929 A1 * | 5/2009 | ............ G01S 13/42 |
| JP | H075252 A | 1/1995 | |
| JP | 2001174539 A | 6/2001 | |
| JP | 2008128657 A | 6/2008 | |
| JP | 2010145289 A | 7/2010 | |
| JP | 2011064584 A | 3/2011 | |
| WO | 2007083479 A1 | 7/2007 | |
| WO | WO 2012/041 652 | 4/2012 | |

\* cited by examiner

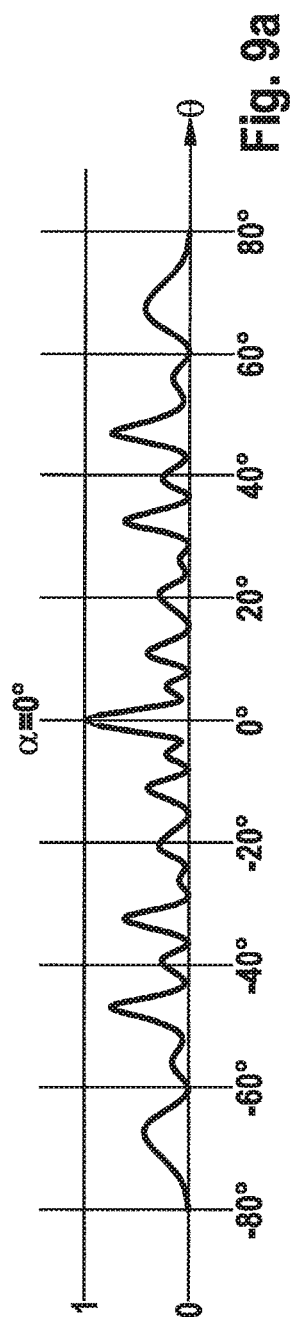
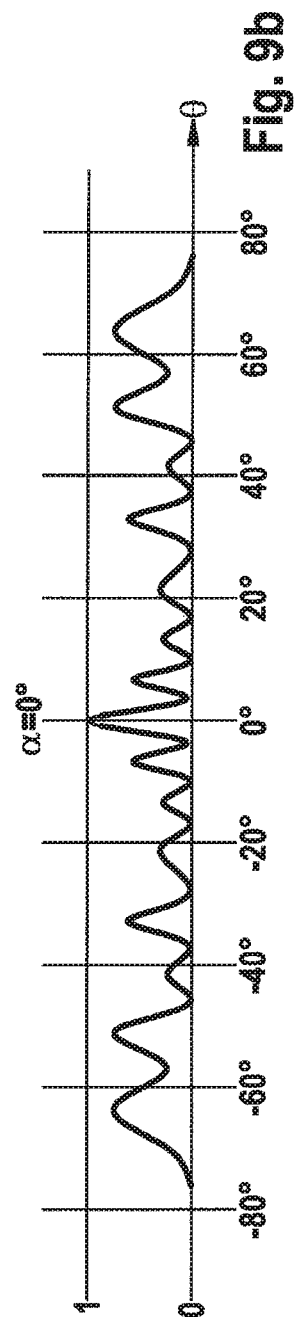
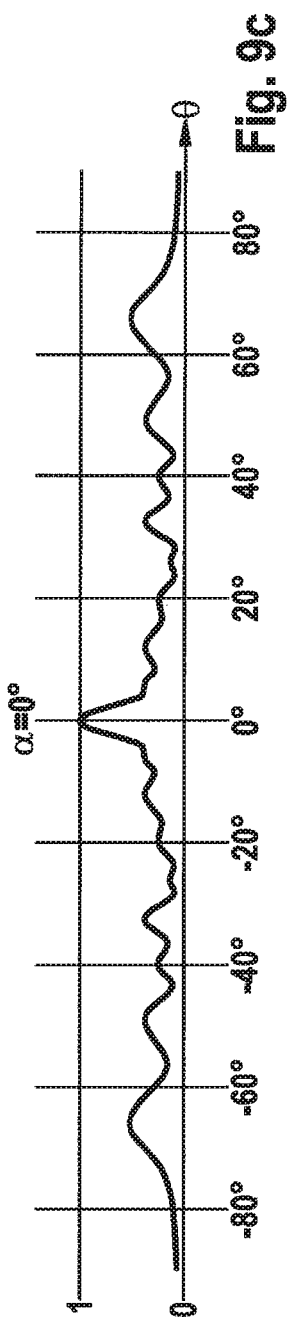

ANGLE-RESOLVING FMCW RADAR SENSOR

FIELD OF THE INVENTION

The present invention relates to an angle-resolving FMCW radar sensor, in particular for motor vehicles, including multiple antenna elements which are situated in various positions in a direction in which the radar sensor is angle-resolving and which form at least three transmitter arrays and at least one receiver array, and including a control and evaluation device which is configured for an operating mode in which the at least three transmitter arrays periodically transmit signals whose frequency is modulated according to a series of modulation ramps, and in which radar echoes of the transmitted signals are received in each case by multiple antenna elements of the at least one receiver array, and the angle of a located object is determined based on amplitude relationships and/or phase relationships between radar echoes which correspond to different combinations of transmitter arrays and receiver arrays.

BACKGROUND INFORMATION

Radar sensors are used in motor vehicles, for example for measuring the distances, relative speeds, and azimuth angles of vehicles or other objects located ahead of the host vehicle. The individual antenna elements are then situated, for example, at a distance from one another on a horizontal, so that different azimuth angles of the located objects result in differences in the run lengths which the radar signals have to cover from the object to the particular antenna element. These run length differences result in corresponding differences in the phase of the signals which are received by the antenna elements and evaluated in the associated evaluation channels. By balancing the (complex) amplitudes received in the various channels with corresponding amplitudes in an antenna diagram, the incidence angle of the radar signal, and thus the azimuth angle of the located object, may then be determined.

The aperture of the antenna should be as large as possible in order to achieve a high angular resolution. However, if the distances between the adjacent antenna elements are too great, ambiguities in the angular measurement may occur, since for run length differences which differ by whole number multiples of wavelength $\lambda$, the same phase relationships are obtained between the received signals. An unambiguous angular measurement may be achieved, for example, using a uniform linear array (ULA) structure, in which the antenna elements are spaced apart at intervals of $\lambda/2$. In this case, however, with increasing aperture, the number of antenna elements and therefore also the number of required evaluation channels also increases, resulting in correspondingly high hardware costs.

In a multiple input/multiple output (MIMO) radar, a higher angular resolution capability is achieved by operating not only with multiple receiving antenna elements, but also with multiple transmitting antenna elements, whereby different combinations of transmitting antenna elements and receiving antenna elements are evaluated, for example in time multiplex or optionally also in frequency multiplex or code multiplex. The varying positions of the transmitting antenna elements then result in additional phase differences, and thus, in signals which are equivalent to signals that would be obtained with a configuration using a single transmitting antenna element and additional (virtual) receiving antenna elements. In this way, the aperture is virtually enlarged and the angular resolution is thus improved.

With regard to a high angular resolution, it is advantageous when the virtual antenna array is thinned out in such a way that the individual antenna elements are situated at relatively large distances from one another. Under these conditions, however, the requirement for unambiguousness is no longer met, so that, in particular for noisy radar echoes, ambiguities and thus "jumping" angular measurements result; i.e., when a radar target is tracked over an extended period, abrupt changes in the measured azimuth angle occasionally occur.

In a frequency-modulated continuous wave (FMCW) radar sensor, the transmission frequency of a continuous radar signal is modulated in a ramp-shaped manner. A baseband signal is generated from a reception signal by mixing with the transmission signal, and is then evaluated.

Each radar object then stands out in the frequency spectrum of the baseband signal in the form of a peak whose position is a function of the Doppler shift and the propagation time of the radar signals, so that the baseband signal obtained from an individual frequency modulation ramp still does not allow an unambiguous determination of the relative speed and the distance. Rather, the frequency of an obtained peak only establishes a relationship between the speed (relative speed) and the distance, in the form of a linear relationship. (The term "linear" is understood here to mean that the relationship thus referred to may include a linear factor and an additive term.)

In the FMCW method, multiple frequency modulation ramps having different ramp slopes are necessary for identifying multiple radar objects and estimating their relative speeds and distances. Relative speed V and distance D of a radar object may be computed by balancing the different relationships obtained for the individual frequency ramps. This balancing is also referred to as "matching," and corresponds to a search of intersection points of straight lines in the D-V space. The FMCW method is particularly efficient when only a few radar objects are detected.

Radar sensors are also known which operate according to the chirp sequence modulation method, in which the transmission signal is made up of a series of similar frequency-modulated signal pulses (chirps). The modulation pattern is therefore made up of a complete set of successive chirps, not of an individual modulation ramp. This is a pulse-Doppler method with pulse compression, in which initially a separation of the radar objects according to their distances takes place, and changes in location, and thus speeds, of the radar objects are subsequently ascertained based on the differences in phase positions between the reflections of the individual signal pulses. In a typical modulation pattern, the center frequencies of the individual chirps uniformly increase or decrease from chirp to chirp, so that the chirps themselves form a ramp, which is referred to as a "slow ramp," while the chirps are also referred to as "fast ramps." This method is therefore also referred to as "multi-speed FMCW" (MSFMCW).

The MSFMCW method allows a more accurate measurement of the distances and relative speeds, and is more robust in particular in the cases in which a plurality of objects is simultaneously located. However, the slow ramps by their nature have a relatively long length. The time intervals between the individual measurements are thus so long that, due to the proper motion of the objects, the phase correlation between the signals, which is necessary for applying the MIMO principle, is lost.

FIELD OF THE INVENTION

An object of the present invention is to provide a MIMO radar having improved measuring accuracy.

For a radar sensor of the type mentioned at the outset, this object is achieved in that a measuring cycle of the radar sensor includes at least two periods in which in each case at least two combinations of transmitter arrays and receiver arrays are alternated, and the combinations of transmitter arrays and receiver arrays involved are different from one another for the at least two periods.

The use of three or more different combinations of transmitter arrays and receiver arrays allows a larger (virtual) aperture and/or filling of the arrays, so that the accuracy and/or the unambiguousness of the angle estimation is/are improved. However, since not all possible combinations are utilized within a single period, the time interval in which the radar echoes of the signals which are transmitted via various transmitter arrays may be evaluated is shortened. The coherence of these signals and therefore the measuring accuracy are thus improved.

Advantageous embodiments and refinements of the present invention are set forth in the further descriptions herein.

In one advantageous specific embodiment, within each period, for example within each slow modulation ramp, the transmitter array used is changed after each chirp. For example, transmission is carried out via two different transmitter arrays in alternation, whereby each chirp which has been transmitted via an array is transmitted once again immediately thereafter with the identical frequency position and identical deviation, but this time via the other transmitter array, before transmission is carried out once again via the first transmitter array of the next chirp, at a slightly higher frequency.

A "transmitter array" may be made up of a single antenna element or a combination of multiple antenna elements. If the array includes two adjacent antenna elements which are fed with signals of the same frequency, the radar waves emitted by these two antenna elements are superimposed to form a signal having a changed phase position. This signal is equivalent to a signal that would be emitted from a point situated between the two antenna elements. This point forms the so-called "phase center" of the two signals. Since this phase center is situated at a location at which an actual antenna element is not present, due to the joint excitation of two or more antenna elements, additional (virtual) transmitting antenna elements are obtained which may be combined with the actual receiving antenna elements, resulting in filling of the virtual antenna array. In this way, the configuration more closely approaches a ULA structure, and the likelihood of ambiguities decreases.

Interconnecting two or more antenna elements also has the advantage that higher transmitting power is achieved, thus improving the range of the radar sensor.

In one advantageous specific embodiment, the actual antenna elements are spaced at nonuniform intervals, so that the antenna configuration may have few symmetries, which contributes to further suppression of ambiguities. In addition, the situation may thus be avoided in which virtual antenna positions resulting from combinations of different transmitting elements and receiving elements have coinciding locations.

The radar sensor may be configured as a monostatic radar sensor; i.e., each antenna element may be utilized as a transmitting element and also as a receiving element.

When two or more antenna elements are fed with signals of the same frequency, the phases and amplitudes with which the signal is supplied to the two or more elements do not necessarily have to be the same. According to one refinement of the present invention, this results in the option of beamforming.

In the FMCW methods which are common nowadays, the cycle time, i.e., the duration of a single measuring cycle, is the same as the period duration of the frequency modulation. Within a measuring cycle, a certain number of modulation patterns (slow ramps) is transmitted, and the received signals for all received modulation patterns are recorded and evaluated. The cycle time is therefore made up of the time required for transmitting the modulation patterns, and an additional computing time required by a processor for processing the received signals and for computing the distance data and speed data.

For safety-relevant assistance functions, however, it is important that the traffic events can be tracked with high time resolution. This means that the cycle time may be short. Since the duration of the modulation pattern cannot be shortened for reasons of measuring accuracy, shortening the cycle time can be achieved only by shortening the computing time. This requires the use of more powerful and therefore more costly processors.

According to one refinement of the present invention, the signals from at least one earlier measuring cycle may be used for balancing the signal, obtained for a modulation pattern in the instantaneous measuring cycle, with the signal (s) obtained for other modulation patterns.

The present invention makes use of the fact that, due to the inertia of the involved motor vehicles, the speeds change only slightly from measuring cycle to measuring cycle, so that it is essentially only the distances that undergo a significant change from one measuring cycle to the next. Therefore, the speed information is not significantly distorted if, instead of the data from the instantaneous measuring cycle, data from one or multiple immediately preceding measuring cycles are used. If operations are carried out with N different modulation patterns, M is the time required for transmitting an individual modulation pattern, and T is the computing time required for evaluating an individual modulation pattern, in the conventional method, cycle time Z is given by:

$$Z=N*(M+T).$$

In contrast, in the method according to the present invention, the cycle time may be shortened to:

$$Z=M+T$$

by using the results for the last (N−1) measuring cycles for the balancing.

This yields a shortening of the cycle time by (N−1)*(M+T).

In turn, as a result of this shortening of the cycle time, the time interval between the various modulation patterns is also correspondingly short, thus further reducing the errors in the speed data.

In addition, within the scope of the present invention it is possible to switch over not only between various transmitter arrays, but also between various receiver arrays. For this purpose, it is necessary only to provide additional antenna elements, but no additional evaluation channels. The changing of the receiver array then takes place by connecting a different selection of the transmitting antennas to the evaluation channels. The virtual MIMO array may then be further enlarged and/or compressed by the combination with various transmitter arrays.

Exemplary embodiments of the present invention are explained in greater detail with reference to the drawings.

BRIEF DESCRIPTION OF THE DRAWINGS

FIG. 9 shows diagrams for explaining the advantages of the radar sensor.

DETAILED DESCRIPTION

Figure 1:
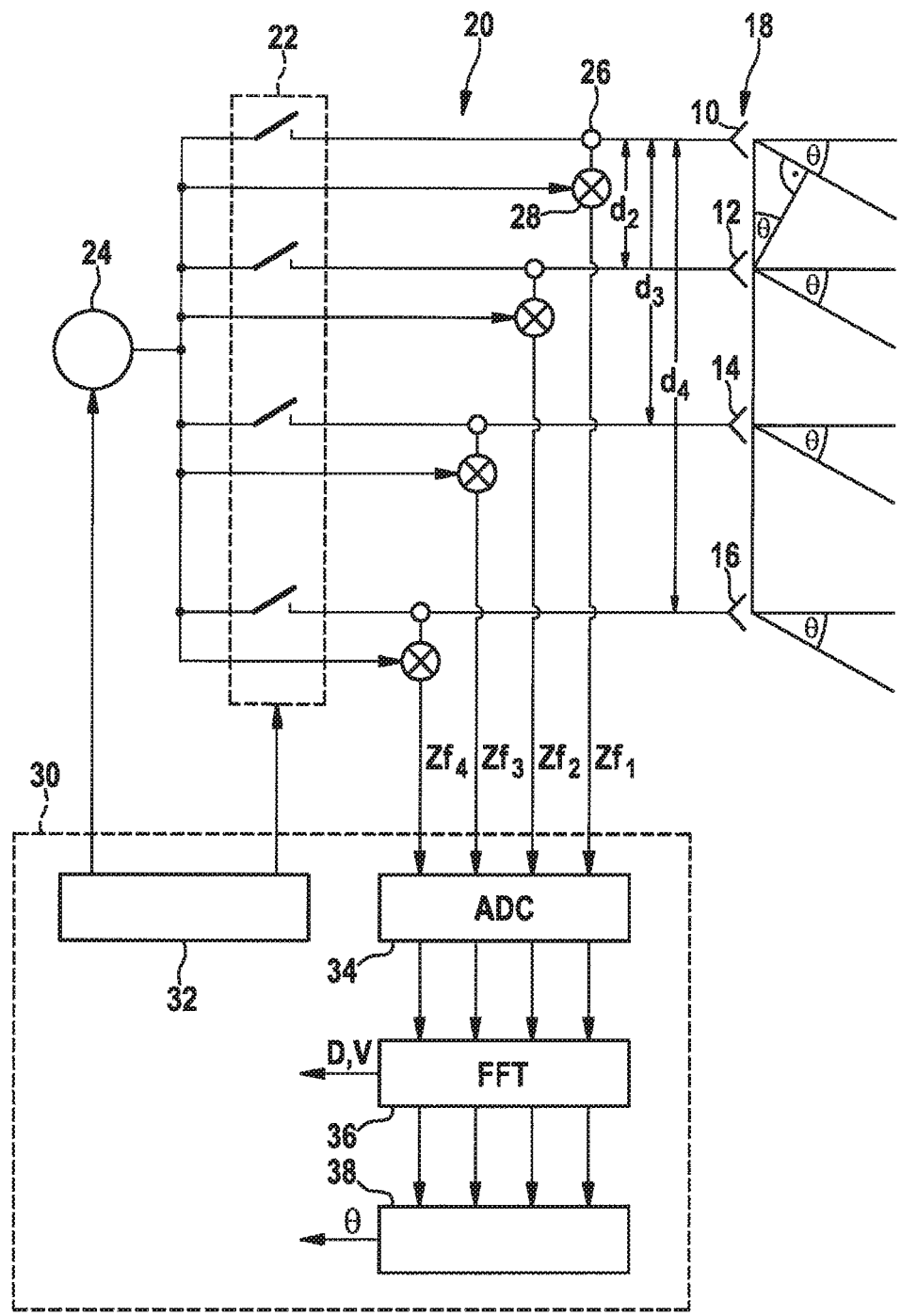
FIG. 1 shows a block diagram of a radar sensor according to the present invention.

The radar sensor shown in FIG. 1 includes four antenna elements 10, 12, 14, 16, which together form a planar group antenna 18. The radar sensor is installed in a motor vehicle in such a way that antenna elements 10 through 16 are situated next to one another at the same level, so that an angular resolution capability of the radar sensor in the horizontal (in the azimuth) is achieved. FIG. 1 symbolically illustrates radar beams which are received by the antenna elements at an azimuth angle θ.

A high frequency portion 20 for controlling the antenna elements is formed, for example, by one or multiple monolithic microwave integrated circuits (MMICs), and includes a switching network 22 via which the individual antenna elements are selectively connectable to a local oscillator 24 which generates the radar signal to be transmitted. The radar echoes received by antenna elements 10 through 16 are each decoupled with the aid of a circulator 26 and supplied to a mixer 28, where they are mixed with the transmission signal delivered by oscillator 24. In this way, for each of the antenna elements an intermediate frequency signal $Zf_1$, $Zf_2$, $Zf_3$, $Zf_4$ is obtained, which is supplied to an electronic control and evaluation unit 30.

Control and evaluation unit 30 contains a control section 32 which controls the functioning of oscillator 24 and switching network 22. The frequency of the transmission signal delivered by oscillator 24 is periodically modulated in the form of a series of rising and/or falling frequency ramps.

In addition, control and evaluation device 30 contains an evaluation section including a four-channel analog/digital converter 34 which digitizes intermediate frequency signals $Zf_1$ through $Zf_4$ obtained from the four antenna elements, and in each case records them over the duration of an individual frequency ramp. The time signals thus obtained are then converted, channel by channel, into corresponding frequency spectra by a fast Fourier transform in a transformation step 36. In these frequency spectra, each located object stands out in the form of a peak whose frequency position is a function of the signal propagation time from the radar sensor to the object and back to the radar sensor, and, due to the Doppler effect, is a function of the relative speed of the object. Based on the frequency positions of two peaks which have been obtained for the same object, but on frequency ramps having different slopes, for example a rising ramp and a falling ramp, distance D and relative speed V of the object in question may then be computed.

The functional principle of an MSFMCW radar is initially explained, with reference to FIGS. 2 through 6.

Figure 2:
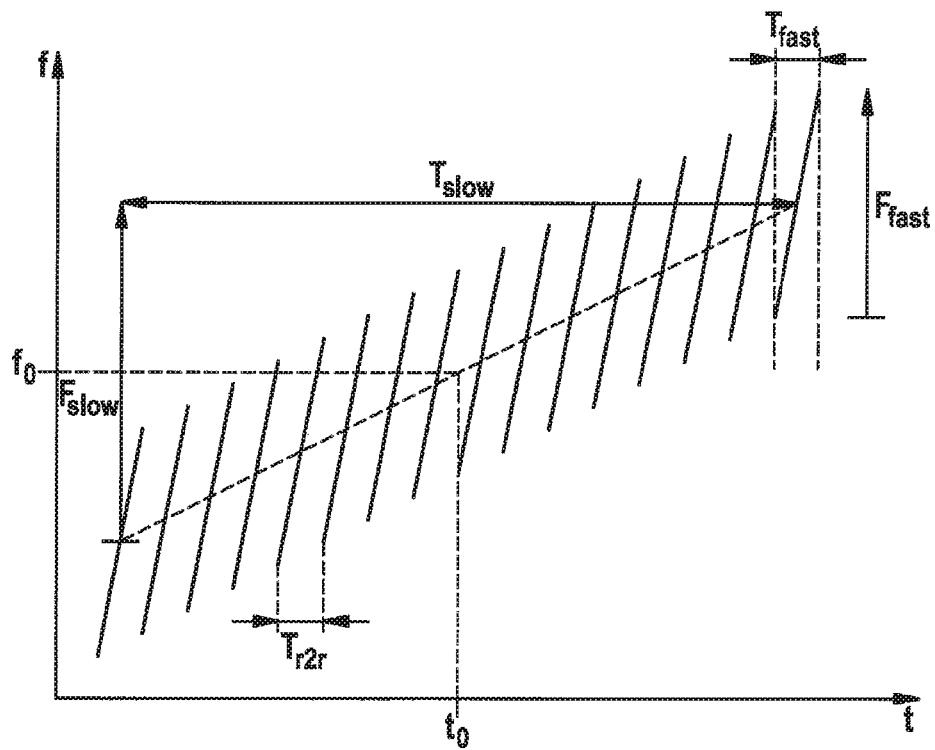
FIG. 2 shows a schematic illustration of a series of frequency modulation ramps (chirps) of a transmission signal.

FIG. 2 illustrates frequency f of a transmission signal over time t, in the form of a series of (fast) frequency ramps (chirps), each having a deviation $F_{fast}$ and a time period $T_{fast}$. The individual frequency ramps follow one another at a time interval $T_{r2r}$ ("ramp-to-ramp"). In the example shown in FIG. 2, $T_{fast}$ is equal to $T_{r2r}$, so that the individual frequency ramps follow one another in direct succession.

FIG. 2 shows a general illustration in which the center frequency of the individual frequency ramps changes as the series progresses. In particular, the center frequency of the fast ramps describes on its part a linear frequency ramp with center frequency $f_0$ at point in time $t_0$. This frequency ramp is also referred to below as a slow ramp. It has a frequency deviation $F_{slow}$ for a ramp duration $T_{slow}=(N_{slow}-1))*T_{r2r}$, where $N_{slow}$ refers to the number of fast ramps.

In the case that the slow ramp has a frequency deviation of 0, the fast ramps in the series are identical, i.e., describe identical frequency curves.

Two or more different series of fast ramps are used in one measuring cycle, within the particular series the fast ramps (chirps) each having the same frequency deviation $F_{fast}$, the same ramp duration $T_{fast}$, and the same time interval $T_{r2r}$ between the ramps. The at least two series within a measuring cycle may, for example, differ by different values of the absolute value and/or by the algebraic sign of frequency deviation $F_{fast}$ of the fast ramps, different ramp durations of the fast ramps, different ramp repeat times $T_{r2r}$ of the fast ramps, different center frequencies $f_0$ of the slow ramps, a different number $N_{slow}$ of fast ramps, and/or different frequency deviations $F_{slow}$ of the slow ramp.

For simplification of the illustration, the evaluation of the measuring signal for a single series of fast ramps of the transmission signal is initially explained below.

The frequency of the transmission signal is in the range of 76 GHz, for example. For example, the center frequency of the slow ramp may be 76 GHz.

In the baseband signal delivered by mixer 28, a partial signal having duration $T_{fast}$ is associated with each fast ramp in the series. For a radar object in the detection range of the radar sensor system, it may be assumed that the signal propagation time is short compared to ramp duration $T_{fast}$.

A frequency spectrum of at least one partial signal is evaluated in a first step of the evaluation. The partial signal of the baseband signal, which corresponds to a fast ramp, is sampled at a number $N_{fast}$ of equidistant points in time, i.e., digitized, and a frequency spectrum of the partial signal is determined. The frequency spectrum is computed, for example by computing a fast Fourier transform (FFT).

Figure 3:
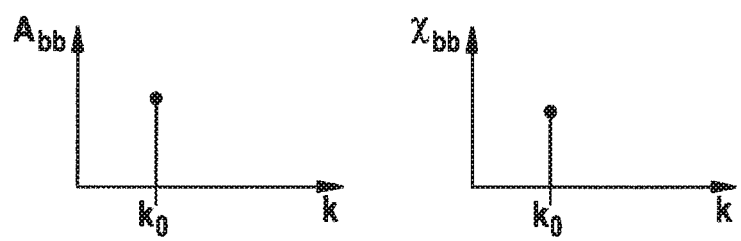
FIG. 3 shows a schematic illustration of the amplitude and phase position of a peak in the frequency spectrum of an individual chirp.

FIG. 3 schematically shows amplitude $A_{bb}$ and phase $\chi_{bb}$ of the obtained signal in polar coordinates, plotted with respect to frequency bin k.

For a signal reflected by a single radar object, a peak having amplitude $A_{bb}(k_0)$ is obtained, for example in frequency bin $k_0$, with which a corresponding phase $\chi_{bb}(k_0)$ is associated. Frequency bin $k_0$ indicates the frequency position of the radar object in the frequency spectrum in question of the partial signal.

During a linear frequency modulation of the transmission signal, the frequency position of a peak associated with a radar object is made up of a sum of two terms, the first term being proportional to the product of distance D of the radar object from the radar sensor and ramp deviation $F_{fast}$, and the second term being proportional to the product of relative speed V of the radar object, the center frequency of the fast ramp, and ramp duration $T_{fast}$. This corresponds to the FMCW equation $$k_0=(2/c)(D_{0,r}F_{fast}+f_{0,r}V_{0,r}T_{fast}),$$

where c is the speed of light, $D_{0,r}$ is the distance of the object from the central point in time of the rth ramp, where r=1, 2, ..., $N_{slow}$, $f_{0,r}$ is the center frequency of the rth ramp, and $V_{0,r}$ is the relative speed of the radar object at the central point in time of the rth fast ramp. The ascertained frequency position of the peak thus corresponds to a linear relationship between relative speed V and distance D of the radar object. This relationship represents a first piece of information concerning the relative speed and the distance of the radar object. The relationship is in particular a function of ramp deviation $F_{fast}$, ramp duration $T_{fast}$, and center frequency $f_{0,r}$ of the fast ramps.

For relative speeds V and accelerations of a radar object which are not too high, approximately the same frequency position of the peak results over the series of fast ramps, and in the following discussion, $k_0$ denotes this center frequency bin of the radar object over all fast ramps of the series.

For frequency position $k_0$, phase $\chi_{bb}(k_0)$ associated with the peak is particularly sensitive to changes in the distance of the radar object while passing through the series of fast ramps. Thus, a change in distance by one-half the wavelength of the radar signal already results in a phase shift by one whole period of the oscillation.

Figure 4:
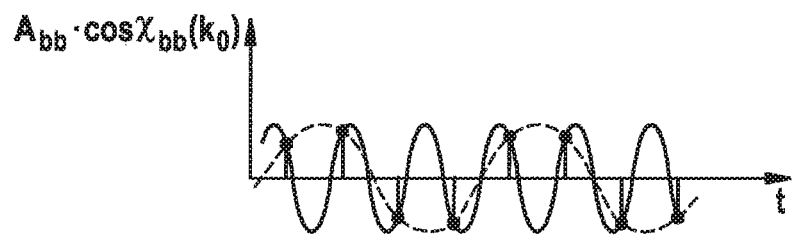
FIG. 4 shows a schematic illustration of amplitude values of a peak in the frequency spectra of multiple chirps.

FIG. 4 schematically shows, with a solid line, the time curve of the actual portion of the spectrum, which corresponds to a harmonic oscillation:

$$A_{bb}*\cos\chi_{bb}(k_0)$$

for frequency position $k_0$ of the radar object in the frequency spectra during progression through the series of fast ramps. The harmonic oscillation illustrated in solid lines corresponds to a case without acceleration of the radar object.

At a radar signal frequency of approximately 76 GHz, the wavelength is approximately 4 mm. At a relative speed of 86 km/h, corresponding to 24 m/sec, the phase thus changes with a frequency of 12,000 Hz. A peak corresponding to this frequency is expected in the frequency spectrum of the time curve of the actual portion, the time curve corresponding to the successive fast ramps, and each ramp corresponding to a sampling value of the time curve. If the Nyquist-Shannon sampling theorem is violated due to a sampling frequency of the phase changes which is too low, i.e., a ramp repeat time $T_{r2r}$ which is too large, the frequency of the phase changes cannot be unambiguously determined.

FIG. 4 schematically shows this type of undersampling. The values of the actual portion at the central points in time of the particular fast ramps are marked. It is not possible to decide whether the true frequency of the phase changes is indicated by the curve depicted by solid lines, or by the curve depicted in dashed lines. Therefore, the frequency is ambiguous.

The frequency position of the harmonic oscillation corresponding to the phase change may be determined by again subjecting the function, which indicates phase $\chi_{bb}(r)$ measured for an object as a function of ramp index r, to a Fourier transform. This frequency position may be indicated by its frequency bin $I_0$, and is approximately additively composed of a term, which is proportional to average distance D and to ramp deviation $F_{slow}$ of the slow ramp, and a term which is proportional to average relative speed V, ramp duration $T_{slow}$ of the slow ramp, and center frequency $f_0$ of the slow ramp. This in turn corresponds to an FMCW equation for the slow ramp:

$$I_0=(2/c)(DF_{slow}+VT_{slow}f_0).$$

In the general case, i.e., with a ramp deviation of slow ramp $F_{slow}\neq 0$, based on the ascertained frequency position, a linear relationship between the relative speed and the distance of the radar object results which, however, is ambiguous with regard to relative speed V and distance D. This relationship represents a second piece of information concerning the relative speed and the distance of the radar object. In the special case $F_{slow}=0$, reference is still made below to a slow ramp, which has a slope of 0 and results in a second piece of information solely concerning the speed. The slow ramp is unambiguous with regard to relative speed V, up to whole number multiples of the product of one-half the wavelength and sampling frequency $1/T_{r2r}$ of the slow ramp.

Figure 5:
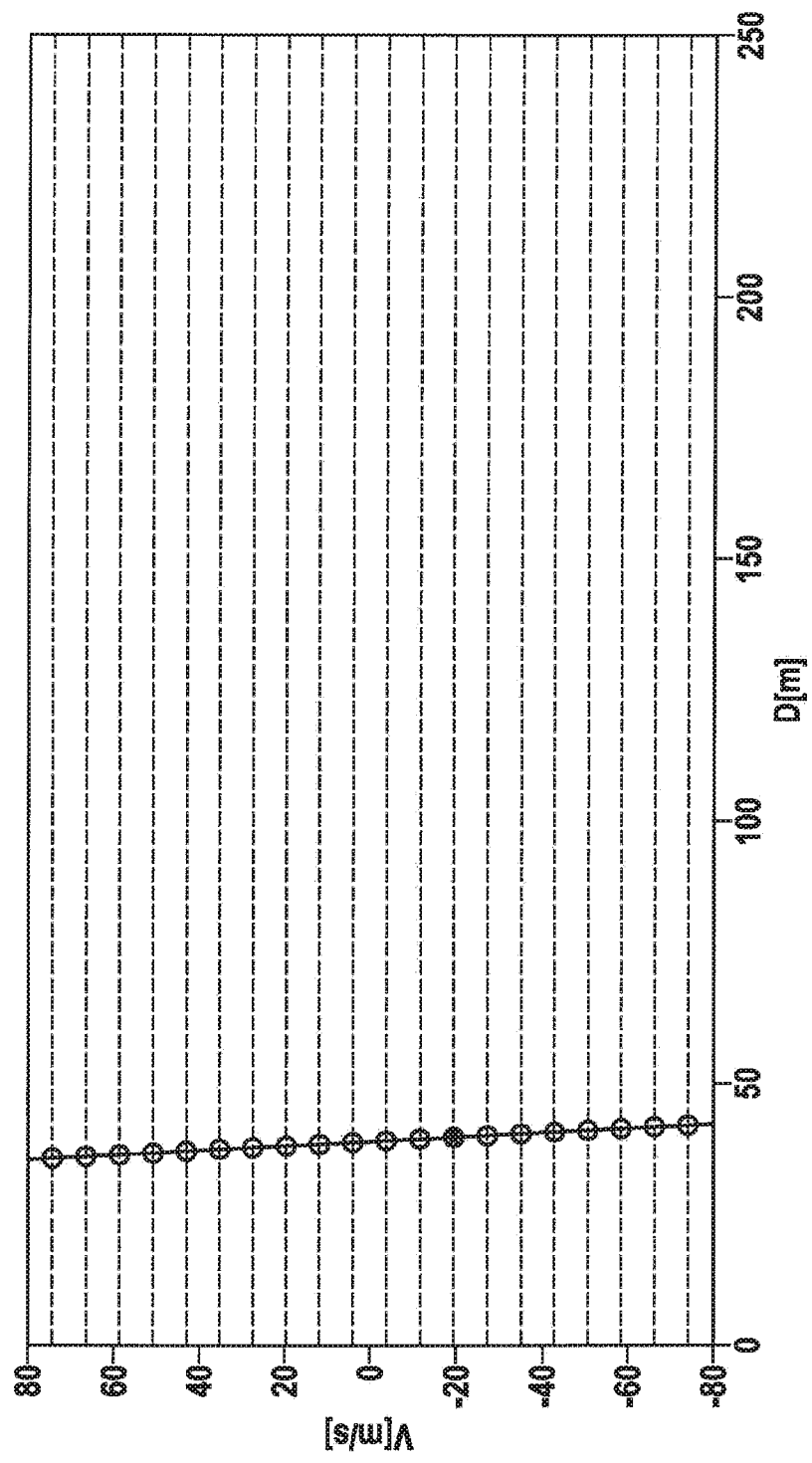
FIG. 5 shows a schematic illustration of relationships between relative speed V and distance D of a radar object from an evaluation of a series of chirps.

FIG. 5 shows, by way of example, information concerning relative speed V and distance D, which results from the evaluation of the measuring signal for a series of frequency ramps. The parameters of the frequency modulation are as follows: $F_{fast}$=425 MHz, $T_{fast}$=0.25 ms, each fast ramp is sampled at $N_{fast}$=512 sampling points in time, the frequency deviation of the slow ramp is $F_{slow}$=0, the time interval of the fast ramps is $T_{r2r}$=0.25 ms, the number of fast ramps, i.e., the number of sampling points in time for the slow ramp, is $N_{low}$=16, resulting in a time period of the slow ramps of $T_{slow}$=4 ms. The detected radar object has a distance of d=40 m and a relative speed v=−20 m/s.

Based on the evaluation of a frequency spectrum of a partial signal, a straight line results which is inclined with respect to the vertical and which corresponds to a linear relationship between relative speed V and distance D. Since the ramp deviation of slow ramp $F_{slow}$=0, based on the Fourier analysis of the values of the frequency spectra of the partial signals at frequency position $k_0$ of the radar object, an ambiguous value results for relative speed V, corresponding to the horizontal dashed equidistant lines in the diagram in FIG. 5. This ambiguous value represents the second piece of information concerning the relative speed. Potential value pairs (V, D) result from linking the first piece of information with the second piece of information, taking the mentioned ambiguity into account. This is denoted in FIG. 5 by circles, which depict a tolerance range for carrying out the balancing. The true target at V=−20 m/s is marked by an asterisk.

Unambiguousness of the ascertainment of the relative speed and distance of the radar object may be established by taking into account further first pieces of information concerning the relative speed and distance, and/or further second pieces of information concerning the relative speed and optionally the distance.

Figure 6:
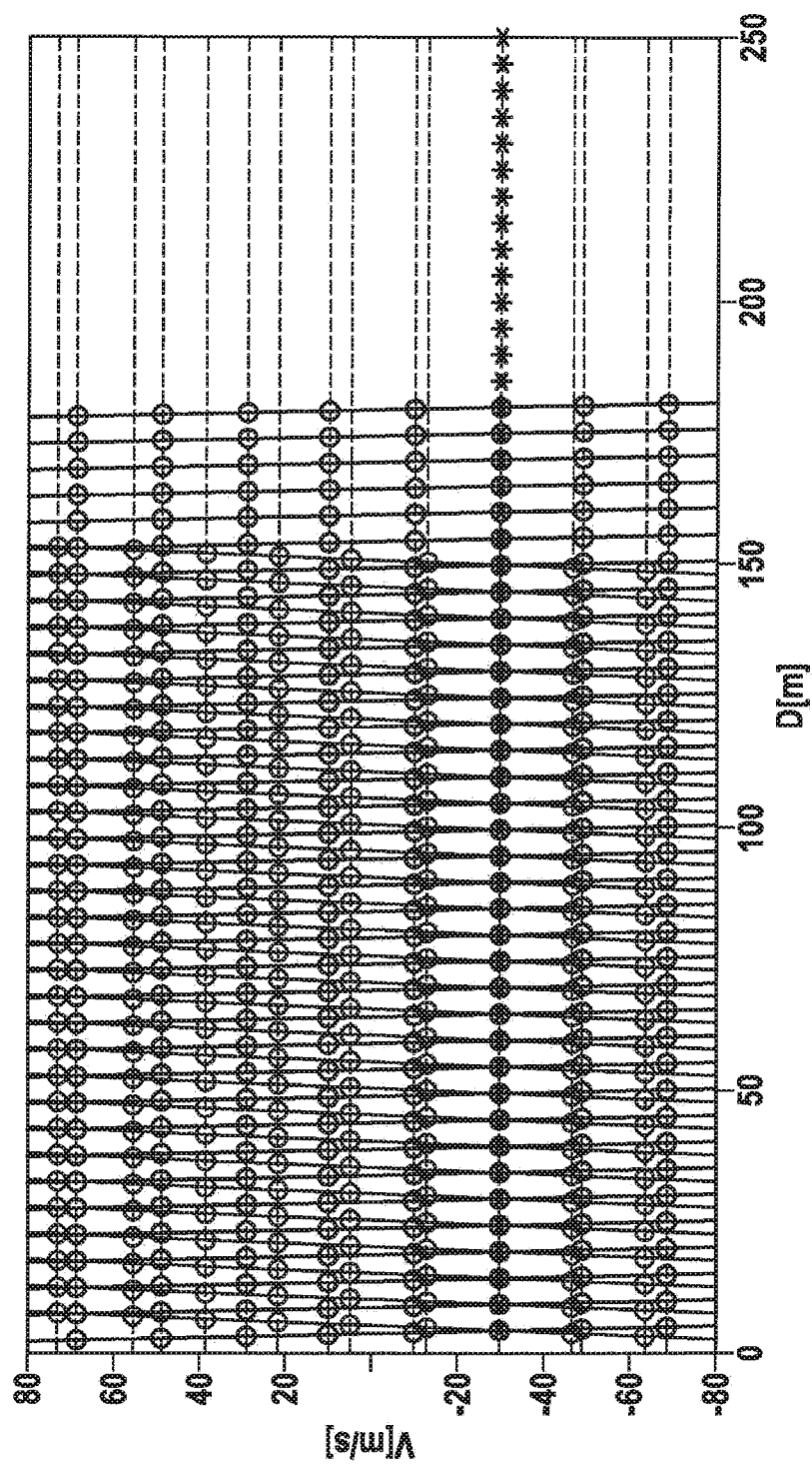
FIG. 6 shows a schematic illustration for explaining a balancing of different ascertained relationships between V and D from signals which are associated with two series of frequency ramps.

FIG. 6 schematically depicts an unambiguous determination of relative speeds and distances of radar objects, using two different modulation patterns in each measuring cycle.

The parameters of the first modulation pattern are as follows: $F_{fast}$=425 MHz, $T_{fast}$=0.10 ms, $N_{fast}$=1024, $F_{slow}$=0, $T_{r2r}$=0.10 ms, and $N_{slow}$=32, resulting in $T_{slow}$=3.2 ms.

The parameters of the second modulation pattern are as follows: $F_{fast}=-250$ MHz, $T_{fast}=0.115$ ms, $N_{fast}=512$, $F_{slow}=0$, $T_{r2r}=0.115$ ms, and $N_{slow}=32$, resulting in $T_{slow}=3.68$ ms.

In this example, it is assumed that a number of radar objects with a relative speed of V=−30 m/s are present in the distance range of D=5 m to D=250 m, the distance between the radar objects being 5 m in each case. This may involve stationary targets, for example, toward which the host motor vehicle is moving at a speed of 30 m/s.

The linear relationships between V and D are different for the two modulation patterns. The first modulation pattern delivers a set of parallel, downwardly sloping straight lines, one straight line for each object. Similarly, the second modulation pattern delivers a set of upwardly sloping straight lines. In addition, the second pieces of information concerning speed V of the radar object ascertained from the two modulation patterns have different ambiguity ranges.

In FIG. 6, the intersection points of the straight lines are indicated by circles, as in FIG. 5. The balancing of the signals obtained from the two modulation patterns takes place by searching for those values of relative speed V and distance D which best match the straight line intersection points delivered by the two modulation patterns. In the example shown, relative speed V=−30 m/s is thus obtained for all objects.

The chain of stationary radar objects at a relative speed of V=−30 m/s may be resolved and detected up to a distance of 150 m.

To make the method more robust against situations in which multiple objects having different relative speeds are simultaneously located, it is advantageous to operate not just with two different modulation patterns, but, rather, with at least three different modulation patterns, per measuring cycle.

Figure 7:
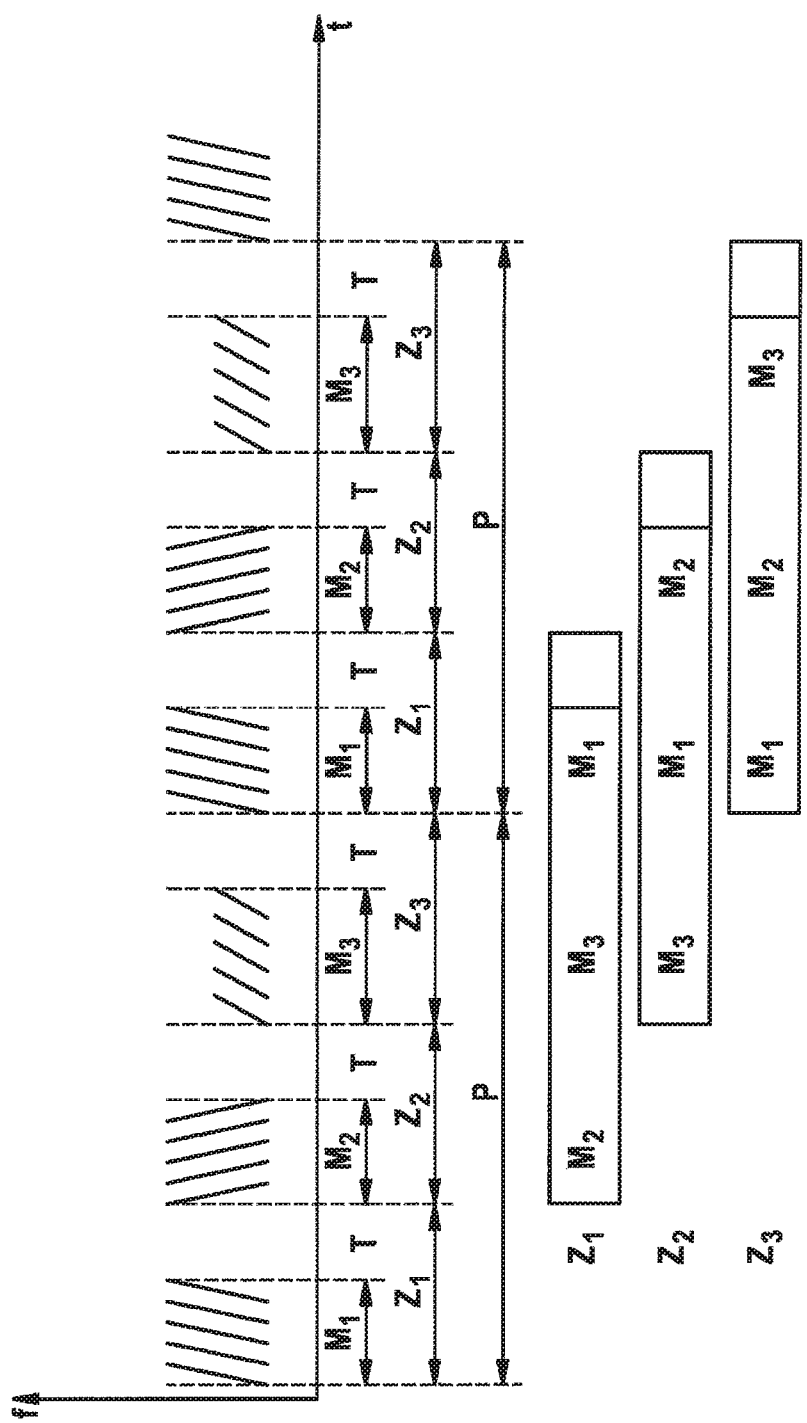
FIG. 7 shows one example of a cycle pattern for the radar sensor according to the present invention.

However, to achieve a shorter cycle time, operations may be carried out with a cycle pattern illustrated in FIG. 7. In this figure (for simplicity, for slow ramps having a slope of zero), frequency f of the transmission signal for two complete measuring cycles P is plotted with respect to time t. The frequency is modulated in each measuring cycle P according to three different modulation patterns $M_1$, $M_2$, and $M_3$. Each modulation pattern is followed by a computing time interval of length T, within which the baseband signal obtained for the modulation pattern in question is evaluated.

In addition, a balancing of the results which have been obtained for the last three modulation patterns takes place within each computing time interval. In FIG. 7, this is symbolically represented for the computing time intervals in the second measuring cycle. This measuring cycle contains three partial cycles $Z_1$, $Z_2$, and $Z_3$. In partial cycle $Z_1$, the result (the set of straight lines in the V-D diagram) which has been obtained for modulation pattern $M_1$ in the instantaneous measuring cycle is balanced with the results which have been obtained for modulation patterns $M_2$ and $M_3$ in the two preceding partial cycles (within preceding measuring cycle P). Due to this balancing, for each object an unambiguous value pair is thus obtained for distance and relative speed, which may be output at the end of this partial cycle. Similarly, in partial cycle $Z_2$ the result which has been obtained for modulation pattern $M_2$ in this partial cycle is balanced with the result for immediately preceding modulation pattern $M_1$, and for modulation pattern $M_3$ preceding modulation pattern $M_1$. An analogous procedure is also followed for partial cycle $Z_3$.

In this way, updated values for the distance and the relative speed of each object are already obtained after a cycle time which is composed only of the duration of an individual modulation pattern and computing time T.

The MIMO principle and its combination with the MSFMCW method described above are now explained, with reference to FIGS. 1, 7, and 8.

As schematically illustrated in FIG. 1 based on the radar beams, as a result of the different positions of antenna elements 10 through 16, the radar beams which have been emitted by the same antenna element, reflected on the object, and then received by the various antenna elements cover different run lengths and therefore have phase differences, which are a function of azimuth angle θ of the object. In addition, associated intermediate frequency signals $Zf_1$ through $Zf_4$ have corresponding phase differences. Furthermore, the amplitudes (absolute values) of the received signals are different from antenna element to antenna element, likewise as a function of azimuth angle θ. The dependency of the complex amplitudes, i.e., the absolute values and phases, of the received signals on azimuth angle θ may be stored for each antenna element in the form of an antenna diagram in control and evaluation unit 30. For each located object (each peak in the frequency spectrum), an angle estimator 38 compares the complex amplitudes, obtained in the four reception channels, to the antenna diagrams in order to estimate azimuth angle θ of the object. The value for which the measured amplitudes best correlate with the values read off in the antenna diagrams is assumed to be the most probable value for the azimuth angle.

However, in the MIMO radar described here, the complex amplitudes in the four channels are also a function of which of the four antenna elements 10, 12, 14, 16 is used as the transmitter element. For example, switching network 22 allows a first frequency ramp or a series of frequency ramps to be transmitted via antenna element 10 (the transmitter array is then made up of only single antenna element 10), then switched over to antenna element 12, and then to antenna elements 14 and 16 in succession, after which a new cycle begins. In this way, 4×4=16 different configurations are obtained, which may be described by the following signal model.

For the planar linear antenna array which includes antenna elements 10, 12, 14, 16 as the receiver array, under the ideal assumption of isotropic antenna elements, control vector $a_{r\mu}(\theta)$ has the following components:

$$a_{r\mu}(\theta)=\exp(2\pi i \cdot (d_{r\mu}/\lambda) \cdot \sin(\theta)), \mu=1,\ldots,4.$$

This control vector determines the phase relationships between the complex amplitudes of the signals which are received by the four antenna elements. Index μ denotes the antenna element, and variables $d_{r\mu}$ indicate the positions of the antenna elements in the horizontal, based on any arbitrarily selected origin.

Similarly, control vector $a_{r\nu}(\theta)$ for the receiver array has the components $$a_{r\nu}(\theta)=\exp(2\pi i \cdot (d_{r\nu}/\lambda) \cdot \sin(\theta)), \nu=1,\ldots,4.$$

In the example of a monostatic array including four antenna elements shown in FIG. 1, the location of antenna element 10 may be taken as the coordinate origin, so that the following applies:

$$dr_1=d_{t1}=0,$$

$$d_{r2}=d_{t2}=d_2,$$

$$d_{r3}=d_{t3}=d_3, \text{ and}$$

$$d_{r4}=d_{t4}=d_4.$$

For the angle estimation, the virtual array vector is now formed according to the MIMO principle by forming the Kronecker product from $a_{rv}(\theta)$ and $a_{r\mu}(\theta)$:

$$a(\theta)=(a_{t1}(\theta)\cdot a_{r1}(\theta),a_{t1}(\theta)\cdot a_{r2}(\theta),a_{t1}(\theta)a_{r3}(\theta),a_{t1}(\theta)\cdot a_{r4}(\theta),$$

$$a_{t2}(\theta)a_{r1}(\theta),a_{t2}(\theta)a_{r2}(\theta),a_{t2}(\theta)a_{r3}(\theta),a_{t2}(\theta)\cdot a_{r4}(\theta)$$

$$a_{t3}(\theta)\cdot a_{r1}(\theta),a_{t3}(\theta)\cdot a_{r2}(\theta),a_{t3}(\theta)a_{r3}(\theta),a_{t3}(\theta)a_{r4}(\theta),$$

$$a_{t4}(\theta)\cdot a_{r1}(\theta),a_{t4}(\theta)a_{r2}(\theta),a_{t4}(\theta)a_{r3}(\theta),a_{t4}(\theta)a_{r4}(\theta)).$$

The product vector has 16 components, corresponding to 16 positions of virtual antenna elements. The components of the vector have the form $$a_{rv}(\theta)\cdot a_{r\mu}(\theta)=\exp(2\pi i\cdot((d_{rv}+d_{r\mu})/\lambda)\cdot\sin(\theta));\ v=1,\ldots,4;\ v=1,\ldots,4.$$

The virtual antenna positions thus correspond to the sums which may be formed from variables $d_1$ through $d_4$. The virtual array thus extends in the horizontal over a significantly larger span; i.e., it has a larger aperture and therefore results in a higher angular resolution, since even small changes in azimuth angle $\theta$ result in fairly large phase differences.

However, if values $d_1$ through $d_4$ are selected to be much larger than $\lambda/2$ in order to obtain what may be a large aperture, due to the periodicity of factor $\sin(\theta)$ in the components of the array vector, in individual cases azimuth angles occur for which the antenna diagrams for all virtual antenna elements have similar complex amplitudes, so that the actual azimuth angle of the object cannot be unambiguously determined.

The virtual array may therefore be filled by additional virtual elements. For this purpose, switching network 22 in certain operating phases is controlled in such a way that two switches are simultaneously closed, i.e., two associated antenna elements 10, 12, 14, 16 are simultaneously fed with the same signal. The transmitted signals then overlap to form a signal whose wave pattern has approximately the shape as if it emanated from a point in the middle between the antenna elements in question.

If, for example, antenna elements 10 and 12 are jointly fed, an additional component $\exp(2\pi i\cdot(d_2/2\lambda)\cdot\sin(\theta))$ is obtained in the control vector for the transmitter array, corresponding to an additional antenna element in position $d_2/2$. The four additional components, corresponding to virtual elements at positions $d_2/2$, $d_2/2+d_2$, $d_2/2+d_3$, and $d_2/2+d_4$, result in the vector of the virtual array. For the true azimuth angle of the object, the antenna diagrams which belong to these virtual elements must also deliver complex amplitudes of intermediate frequency signals $Zf_1$ through $Zf_4$ measured for the peak of the object. The additional elements thus contribute toward avoiding any ambiguities.

In practice, not all possible combinations of antenna elements 10 through 16 have to be utilized as transmitter arrays; instead, a meaningful selection is made. An example of one possible operating mode is illustrated in diagram form in FIG. 8.

Frequencies $f_1$ through $f_4$ of the signals transmitted by antenna elements 10 through 16 are plotted as a function of time t in the upper part of the diagram. In a first period 1 only antenna elements 10 and 16 are active, and transmit signals (frequencies $f_1$ and $f_4$) made up of a rising slow frequency ramp 40, 42 including chirps 44, 46. Chirps 44 and 46 alternate with one another without overlapping in terms of time. Superimposition of the transmitted signals is thus avoided. First chirp 46, which is transmitted via antenna element 16, has the same frequency position and the same deviation as first chirp 44, which is transmitted via antenna element 10. The two chirps are thus identical copies or replicates. The same applies for each subsequent pair of chirps 44, 46. In this example, the series of chirps 44, 46 are generated by oscillator 24, which is connected to antenna elements 10 and 16 in alternation via switching network 22.

Frequency ramps 40, 42 are repeated in a second period 2. However, switching network 22 now connects the oscillator to the two antenna elements 10 and 12 during chirps 44, and to the two antenna elements 14 and 16 during chirps 46, so that in each case the transmitter array is made up of a pair of adjacent antenna elements.

Falling slow frequency ramps 48, 50 including chirps 52, 54 are transmitted in subsequent periods 3 and 4 according to the same pattern. A full measuring cycle is thus completed, which in this simplified example contains only two modulation patterns (one rising slow ramp and one falling slow ramp).

For each period, positions d of the transmitting antenna elements (angles in boldface) and the positions of the particular virtual antenna elements (angles shown in thinner lines) are symbolically represented in the lower part of the diagram. In the first period, for chirps 44 the virtual positions match the actual positions. The positions are shifted by $d_4$ for chirps 46, since transmission takes place via antenna element 16, which is shifted with respect to antenna element 10 by this distance.

In subsequent period 2, the transmitter array for chirps 44 has the same effect as an array which includes a single antenna element at position $d_2/2$, and the transmitter array for chirps 46 has the same effect as an array which includes a single antenna element at position $(d_3+d_4)/2$. The virtual positions in periods 3 and 4 also result in the same way.

Figure 8:
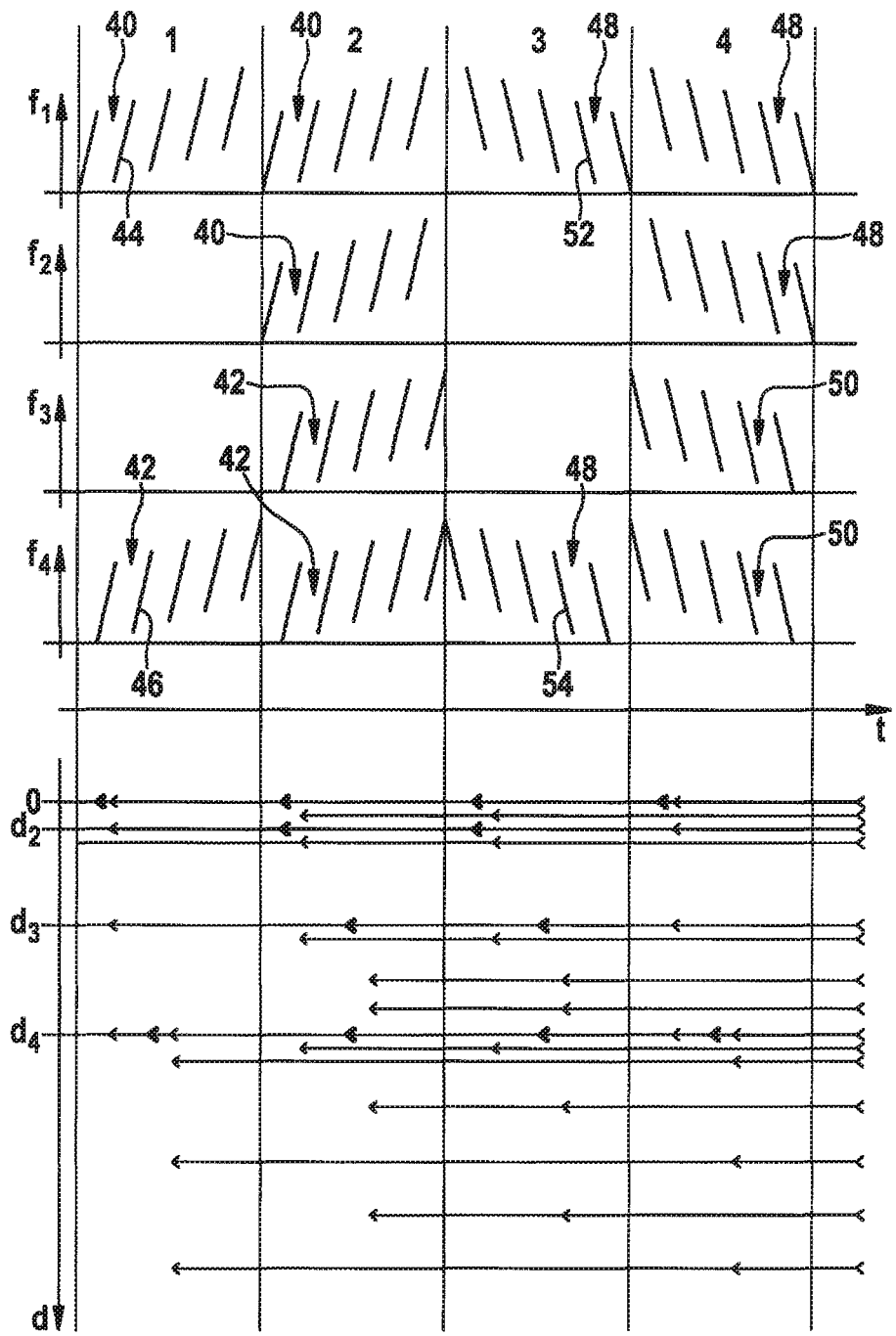
FIG. 8 shows a diagram for explaining the mode of operation of the radar sensor according to FIGS. 1 through 6.

All virtual positions of the antenna elements obtained in this way are illustrated together in the far right column in the lower part of the diagram in FIG. 8. It is apparent that the virtual array is filled to a large degree with additional virtual elements, so that not only is a high angular resolution capability (corresponding to the large aperture) obtained, but also a high degree of unambiguousness (due to the density of the virtual elements within the array) is obtained.

If antenna elements 10 through 16 were situated equidistantly, the positions of some of the virtual antenna elements would coincide. However, in the specific embodiment shown this is avoided in that the distances between the antenna elements are unequal: $d_4-d_3>d_3-d_2>d_2$. In practice, the following values have proven to be suitable (in units of wavelength $\lambda$):

$$d_1=0$$

$$d_2=1.2$$

$$d_3=5.5$$

$$d_4=10.2.$$

For each of the virtual arrays, an antenna diagram may be created which indicates the amplitude relationships and/or phase relationships of the signals received in the four evaluation channels as a function of assumed incidence angle $\theta$ of the radar echo. The azimuth angle of the located object, i.e., actual incidence angle $\alpha$, will generally correspond to assumed incidence angle $\theta$ for which the best agreement results between the amplitude relationships and/or phase relationships actually measured in the evaluation channels, and the corresponding values in the antenna diagram. For the evaluation, a deterministic maximum likelihood (DML) function may be computed which indicates the correlation between the actually measured values and the values in the antenna diagram as a function of incidence angle θ. The function value of the DML function varies between 0 (no correlation) and 1 (complete agreement).

The amplitudes and/or phases (complex amplitudes) measured in the four (in this example) evaluation channels may be regarded as four-component vectors. Similarly, the values in the antenna diagrams also form a four-component vector for each incidence angle θ. The DML function may be computed by normalizing these two vectors to 1 in each case, and then forming the scalar product or the absolute value of the scalar product, i.e., the square of the absolute value. The maximum of the DML function then provides the best estimated value for the azimuth angle of the object.

For determining these estimated values, for each of chirps 44, 52 and for each peak found therein (i.e., for each located object), angle estimator 38 forms the four-component amplitude vector and computes the DML function based on the antenna diagrams for the virtual array which is used in periods 1 and 3. Similarly, the DML function is computed for chirps 46 and 54 based on the antenna diagrams for the virtual array which is used in periods 2 and 4.

FIGS. 9(a) and 9(b) show examples of these two DML functions, in each case under the assumption that the radar radiation strikes at the front (actual incidence angle α=0°), and the received signals are not noisy. The top diagram (a) shows the DML function for periods 2 and 4, and diagram (b) shows the DML function for periods 1 and 3. As expected, these functions have a primary maximum at θ=0. However, secondary maxima also occur at other angles.

Diagram (c) in FIG. 9 shows the DML function which corresponds to a combination (of a weighted sum) of diagrams (a) and (b). In this example, diagram (a) is doubly weighted due to the fact that transmission is carried out in the associated switching states via two antenna elements (10 and 12 or 14 and 16) at the same time. However, other types of weighting and other forms of combination (median, for example) are also conceivable.

It is apparent that in this sum a sharply defined maximum is still present at θ=0, while the other maxima are suppressed so greatly that they do not reach the value 1, even taking the noise into account.

For other values of actual incidence angle α, other (asymmetrical) DML functions would be obtained in which the maxima occur at other locations. Each function would then have a primary maximum at the position θ=α.

What is claimed is:

1. An angle-resolving FMCW radar sensor, comprising:
    multiple antenna elements situated in various positions in a direction in which the radar sensor is angle-resolving and which form at least three transmitter arrays and at least one receiver array; and
    a control and evaluation device configured for an operating mode in which the at least three transmitter arrays periodically transmit signals whose frequency is modulated according to a series of modulation ramps, and in which radar echoes of the transmitted signals are received in each case by multiple antenna elements of the at least one receiver array;
    wherein the angle of a located object is determined based on amplitude relationships and/or phase relationships between radar echoes which correspond to different combinations of transmitter arrays and receiver arrays, wherein the control and evaluation device control a measuring cycle of the radar sensor which includes at least two periods in which in each period of the at least two periods: (i) a combination of at least two transmitter arrays transmit, (ii) the at least two transmitters arrays of the combination are alternated between each other a plurality of times within the period, for transmitting, and (iii) each of the at two transmitter arrays of the combination transmit a series of modulation ramps, a center frequency of each ramp of the series of modulation ramps transmitted by each of the two transmitter arrays changing from ramp to ramp over the course of the period;
    wherein the combination of transmitter arrays involved are different from one another for the at least two periods;
    wherein each ramp of the series of the modulation ramps is a rising ramp which increases in frequency over the course of the ramp;
    wherein each of the series of modulation ramps has at least five consecutive individual ramps all having the same slope as one another.

2. The radar sensor of claim 1, wherein the control and evaluation device is configured to make a switchover to another transmitter array after each individual modulation ramp of the series of ramps.

3. The radar sensor of claim 1, wherein the control and evaluation device is configured to make a switchover between two transmitter arrays in alternation within a single period.

4. The radar sensor of claim 1, wherein at least one of the transmitter arrays which is used for transmitting in at least one period is made up of an individual antenna element, and at least one other transmitter array which is used for transmitting in at least one period is made up of at least two antenna elements which are simultaneously fed with signals of the same frequency.

5. The radar sensor of claim 1, wherein each of the antenna elements is selectively operable as part of a receiver array and as part of a transmitter array.

6. The radar sensor of claim 1, wherein the antenna elements which are operable as part of a transmitter array have different distances from one antenna element to another antenna element.

7. The radar sensor of claim 1, wherein for determining the distance of a located object, the control and evaluation device is configured to evaluate differences in the phase positions of received radar echoes which belong to different modulation patterns, and for identifying the radar echoes of multiple simultaneously located objects, the control and evaluation device is configured to balance the results obtained for multiple successive modulation patterns with one another, in each case at least one of these modulation patterns originating from a preceding measuring cycle.

8. The radar system of claim 1, wherein within each period of the periods, the center frequency of each ramp of the series of modulation ramps transmitted by each of the two transmitter arrays increases from ramp to ramp over the course of the period.

9. The radar system of claim 8, wherein the center frequency of each ramp of the series of modulation ramps transmitted by each of the two transmitter arrays increases linearly over the course of the period.

10. The radar system of claim 1, wherein within each period of the periods, the center frequency of each ramp of the series of modulation ramps transmitted by each of the two transmitter arrays decreases from ramp to ramp over the course of the period.

11. An angle-resolving FMCW radar system, comprising:
multiple antenna elements situated in various positions in a direction in which the radar sensor is angle-resolving and which form at least three transmitter arrays and at least one receiver array; and
a control and evaluation device configured for an operating mode in which the at least three transmitter arrays periodically transmit signals whose frequency is modulated according to a series of modulation ramps, and in which radar echoes of the transmitted signals are received in each case by multiple antenna elements of the at least one receiver array;
wherein the angle of a located object is determined based on amplitude relationships and/or phase relationships between radar echoes which correspond to different combinations of transmitter arrays and receiver arrays, wherein the control and evaluation device control a measuring cycle of the radar sensor which includes at least two periods in which in each period of the at least two periods: (i) a combination of at least two transmitter arrays transmit, (ii) the at least two transmitters arrays of the combination are alternated between each other a plurality of times within the period, for transmitting, and (iii) each of the at two transmitter arrays of the combination transmit a series of modulation ramps, a center frequency of each ramp of the series of modulation ramps transmitted by each of the two transmitter arrays changing from ramp to ramp over the course of the period;
wherein the combination of transmitter arrays involved are different from one another for the at least two periods;
wherein each ramp of the series of modulation ramps is a falling ramp which decreases in frequency over the course of the ramp;
wherein each of the series of modulation ramps has at least five consecutive individual ramps all having the same slope as one another.

12. The radar system of claim 1, wherein the at least five consecutive individual ramps of each of the series all have the same frequency deviation and the same time period as one another.

13. The radar system of claim 11, wherein the center frequency of each ramp of the series of modulation ramps transmitted by each of the two transmitter arrays decreases linearly over the course of the period.

14. The angle-resolving FMCW radar system as recited in claim 11, wherein the at least five consecutive individual ramps of each of the series all have the same frequency deviation and the same time period as one another.

* * * * *